United States Patent [19]

Bishop

[11] 4,023,024
[45] May 10, 1977

[54] ELECTRONIC URN DECISION DEVICE

[75] Inventor: Walton B. Bishop, Oxon Hill, Md.

[73] Assignee: The United States of America as represented by the Secretary of the Navy, Washington, D.C.

[22] Filed: May 19, 1975

[21] Appl. No.: 578,952

[52] U.S. Cl. .......................... 235/152; 343/6.5 LC
[51] Int. Cl.² ...................... G06F 7/38; G01S 9/56
[58] Field of Search ................. 235/152; 331/78; 343/6.5 R, 6.5 LC

[56] References Cited

UNITED STATES PATENTS

| 3,522,603 | 8/1970 | Fluhr et al. | 343/6.5 LC |
| 3,801,980 | 4/1974 | Danton et al. | 343/6.5 LC |
| 3,811,038 | 5/1974 | Reddaway | 235/152 |

OTHER PUBLICATIONS

White, Gerald M., "Electronic Probability Generator", Review of Scientific Instruments, vol. 30, No. 9, Sept. 1959.

Primary Examiner—Charles E. Atkinson
Assistant Examiner—Errol A. Krass
Attorney, Agent, or Firm—R. S. Sciascia; Philip Schneider; Norman Brown

[57] ABSTRACT

A probabilistic decision making device produces an "Accept" decision when a predetermined ratio of input 1's to 0's is established for a predetermined total amount of binary information. The decision making process in essence is an implementation of probability theory relating to a classical "Urn" problem. The device forms a standard reference decision device for similar types of decision making apparatus.

5 Claims, 4 Drawing Figures

ELECTRONIC URN DECISION DEVICE

CROSS-REFERENCE TO RELATED APPLICATION

The present application is related to U.S. Pat. No. 3,961,169, issued June 1, 1976, entitled "Biased Bit Generator" by Walton B. Bishop and John M. Hovey, filed in the United States on Mar. 25, 1975 and assigned to the assignee of the present invention.

These applications are incorporated herein by reference.

BACKGROUND OF THE INVENTION

The present invention relates to probabilistic decision devices and more particularly to decision devices making probabilistic decisions through implementation of principles embodied in a classical probability problem termed the "Urn" problem.

The performance of Secondary Radar/IFF Sliding Window Decision Devices is very difficult to analyze theoretically. Hence, lengthy experimental "Monte Carlo" methods are usually used to determine how well such devices perform. There is a classical "urn" problem in the field of statistics and probability that is quite similar to the Secondary Radar/IFF problem, and the analytical solution to this classical problem is well-known. The Electronic Urn Decision Device (this invention) performs, at a very high rate, the functions described in the classical urn problem. Since its proper performance when prescribed inputs are provided can be determined analytically, and the above-mentioned Biased-Bit Generator will provide prescribed inputs as desired, the Electronic Urn Decision Device's performance can be checked very easily.

After it has been determined that the Electronic Urn Decision Device's performance is satisfactory, it can be used as a standard for determining how well other decision devices perform. There are at least two ways in which the effectiveness of operational decision devices can be determined by this standard device:

(1) The decision made by a device under test may be compared with those made by the standard device when the same sequence of inputs are provided to both. Note that the Biased-Bit Generator can repeat a prescribed sequence as often as desired; thus the two decision devices do not have to be treated simultaneously.

(2) The data upon which an operational decision device makes decisions may be recorded and later fed into the standard device. A comparison can then be made of the "standard" device's decisions and the "operational" device's decisions.

The second of these two ways is, of course, much more cumbersome and expensive than the first.

Figure 1:
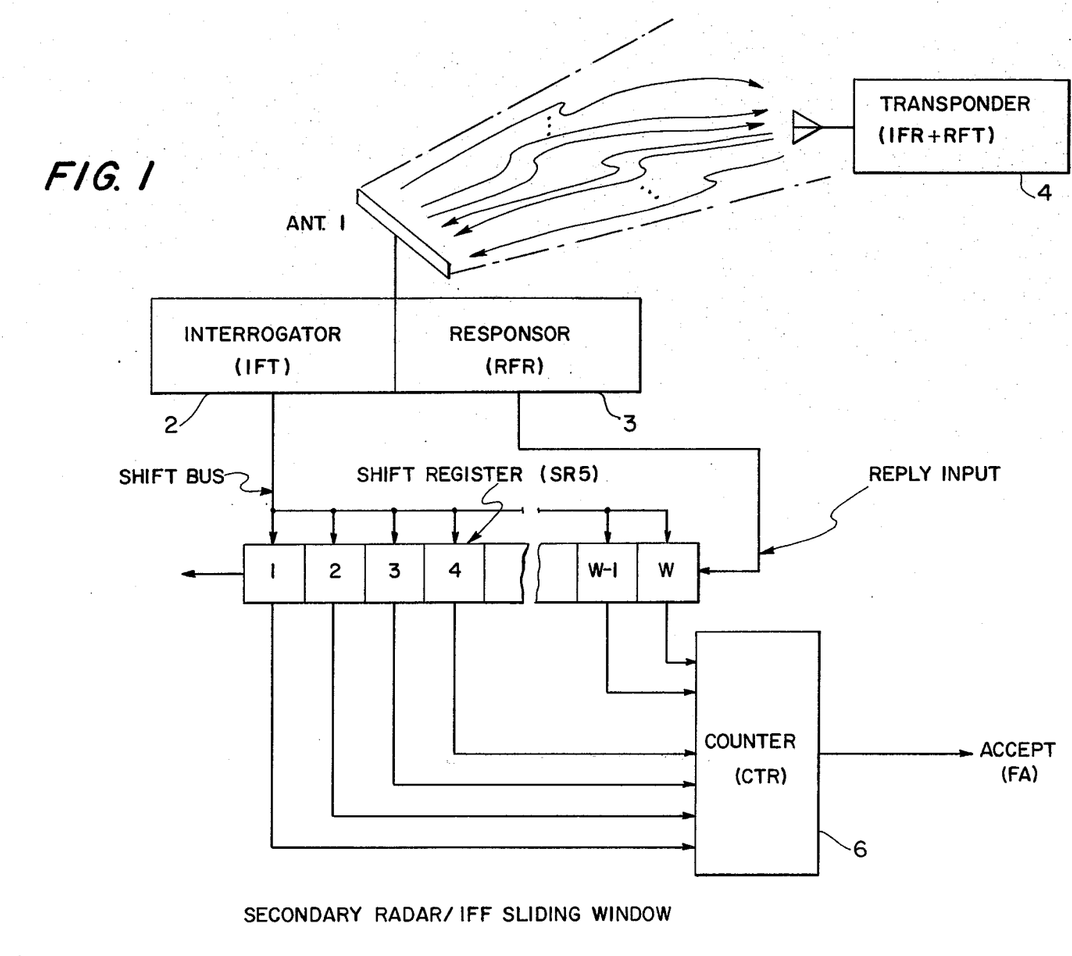
FIG. 1 is a schematic block diagram useful for illustrating the Secondary Radar/IFF sliding window problem.

The basic Secondary Radar/IFF Sliding Window problem is illustrated in FIG. 1. The Shift Register (SR5) is filled with "ones" and "zeros". Each "one" represents receipt of a correct reply and each "zero" represents an incorrect reply (or no reply at all) to an interrogation. After W bits (representing the responses to W interrogations) have entered the shift register, each time a new bit is entered into the register on the right, a bit leaves the register from the left. Thus, the "ones" in the shift register always represent the correct replies received to the last W interrogations. The counter (CTR 6) maintains a continuous count of the number of "ones" in the shift register, and makes an Accept decision if and only if it reaches a preselected threshold number $T_A$.

The probability $p$ that a correct reply will be received may be likened to the drawing of a ball from an Urn (containing only black and white balls of equal size) in which the percentage of black balls is equal to the percentage of interrogations that produce acceptable replies (from a given target). Of course, each time a ball is drawn, it must be returned to the urn and the urn must be thoroughly shaken before another ball is drawn. Thus, we may set $$p = \frac{\text{No. of Black Balls in Urn}}{\text{Total No. of Balls in Urn}}$$

Figure 2:
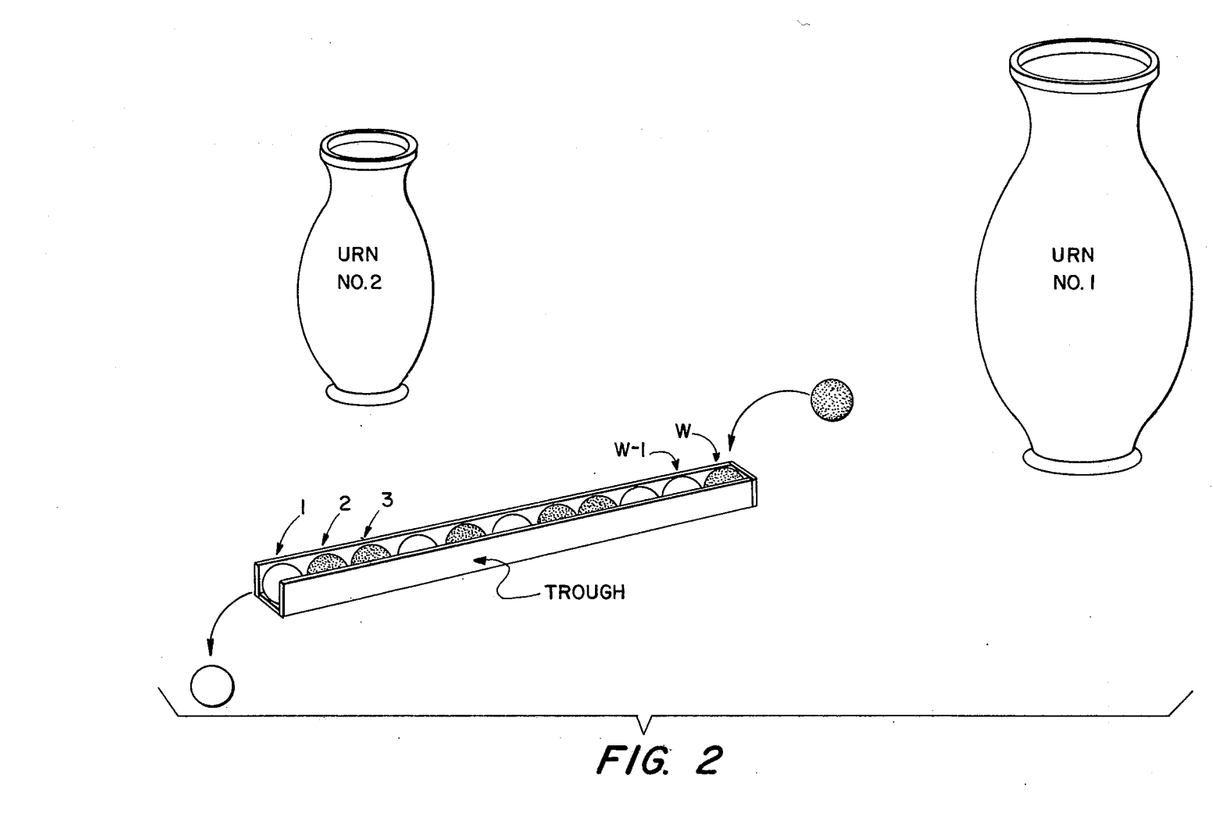
FIG. 2 is a pictorial representation of the classical three-urn problem in the field of probability theory.

If the shift register of FIG. 1 is replaced by an open-ended trough just long enough to hold W balls and, each time a ball is drawn from the urn, a ball of the same color is placed in one end of the trough, then after W balls have been drawn, each ball placed in the trough will force a ball out at the other end. FIG. 2, where balls are to be drawn from Urn No. 1 and then a corresponding ball of the same color placed in the trough, thus represents the sliding window problem. Decisions are made by counting the number of black balls in the trough after each new ball is placed in it. An accept decision is made each time a predetermined number T of black balls are in the trough.

It is easy to determine the probability that a black or white ball will be placed in the trough after each drawing from Urn No. 1, but since the color of the ball pushed out of the trough depends upon what happened W drawings earlier, the storage requirements for exact analysis become very difficult for large values of W. And no simple way of expressing this probability in closed form has been found. If the trough of FIG. 2 is replaced by another urn (Urn No. 2), and instead of taking a specific ball out to make room for the new one, Urn No. 2 is shaken and a ball is drawn at random from it before the new ball is put in, a new decision device will be formed. Note that since Urn No. 2 is thoroughly shaken before each ball is removed from it, the probability that a black (or white) ball will be removed depends only upon the percentage of black (or white) balls in it. If proper choices of W (the number of balls in Urn No. 2) and $T_A$ (the number of black balls needed in Urn No. 2 to produce an Accept decision) are made, then decisions corresponding to those made by the sliding window device of FIG. 1 will result. The probability of making an accept decision in N tries (where N is arbitrary) for any desired percentage of black balls in Urn No. 1 can easily be calculated by iterative use of Equations 2–4 provided below.

The probability $P(X/Y)$ that X black balls will be in Urn No. 2 after Y trials (drawings) is given by the cumulative binomial probability distribution for $Y \leq W$.

$$P(X/Y) \bigg|_{Y \leq W} = \sum_{k=X}^{Y} \binom{Y}{k} p^k (1-p)^{Y-k} \quad (1)$$

Since Equation 1 with $Y=W$ gives the probability of any number $X$ (where $X \leq W$) of black balls in Urn No. 2 after $W$ trials, it is necessary only to find a way of determining the probabilities that $X$ will increase, remain the same, or decrease with the next, or $(W+1)$th trial, in order to use the same procedure iteratively to determine the probability of having X black balls in Urn No. 2 after any number of trials.

The following formulas show how the correct values for $P(X/Y)$ can be found when $Y > W$.

If $X = T_A$, then:

$$P(X/Y) = [P(X-1/Y-1)]\left[\frac{W-(X-1)}{W}\right]p \quad (2)$$

and $$P(X-1/Y) = [P(X-1/Y-1)]\left\{\left[\frac{W-(X-1)}{W}\right](1-p) + \left(\frac{X-1}{W}\right)p\right\}$$

$$+ [P(X-2/Y-1)]\left\{\left[\frac{W-(X-2)}{W}\right]p\right\} \quad (3)$$

If $X \leq T_A - 2$, then $$P(X/Y) = P(X-1/Y-1)\frac{W-(X-1)}{W}p$$

$$+ P(X/Y-1)\left[\frac{W-X}{W}(1-p) + \frac{X}{W}p\right]$$

$$+ P\left(\frac{X+1}{Y}-1\right)\left[\frac{X+1}{W}\right](1-p) \quad (4)$$

SUMMARY OF THE INVENTION

The present invention is a decision device (of the sliding-window-type) utilizing a decision making process which can be analytically well defined in closed form in probabilistic terms. Inadequacies of prior art testing of sliding-window type decision making devices is overcome by the present invention which provides a reference standard decision making device.

A classical Urn problem often referred to in the field of probability and statistics is implemented electronically, along with equations implementing mathematical decisional criteria. In general, the device examines binary information and makes a conclusory decision when a predetermined ratio (between 1's and 0's) is established for a predetermined total amount of binary information.

It is therefore an object of the present invention to make a probabilistic decision regarding the nature of received binary data from a predetermined number of data samples.

Other objects, advantages and novel features of the invention will become apparent from the following detailed description of the invention when considered in conjunction with the accompanying drawings wherein:

DETAILED DESCRIPTION

Figure 3:
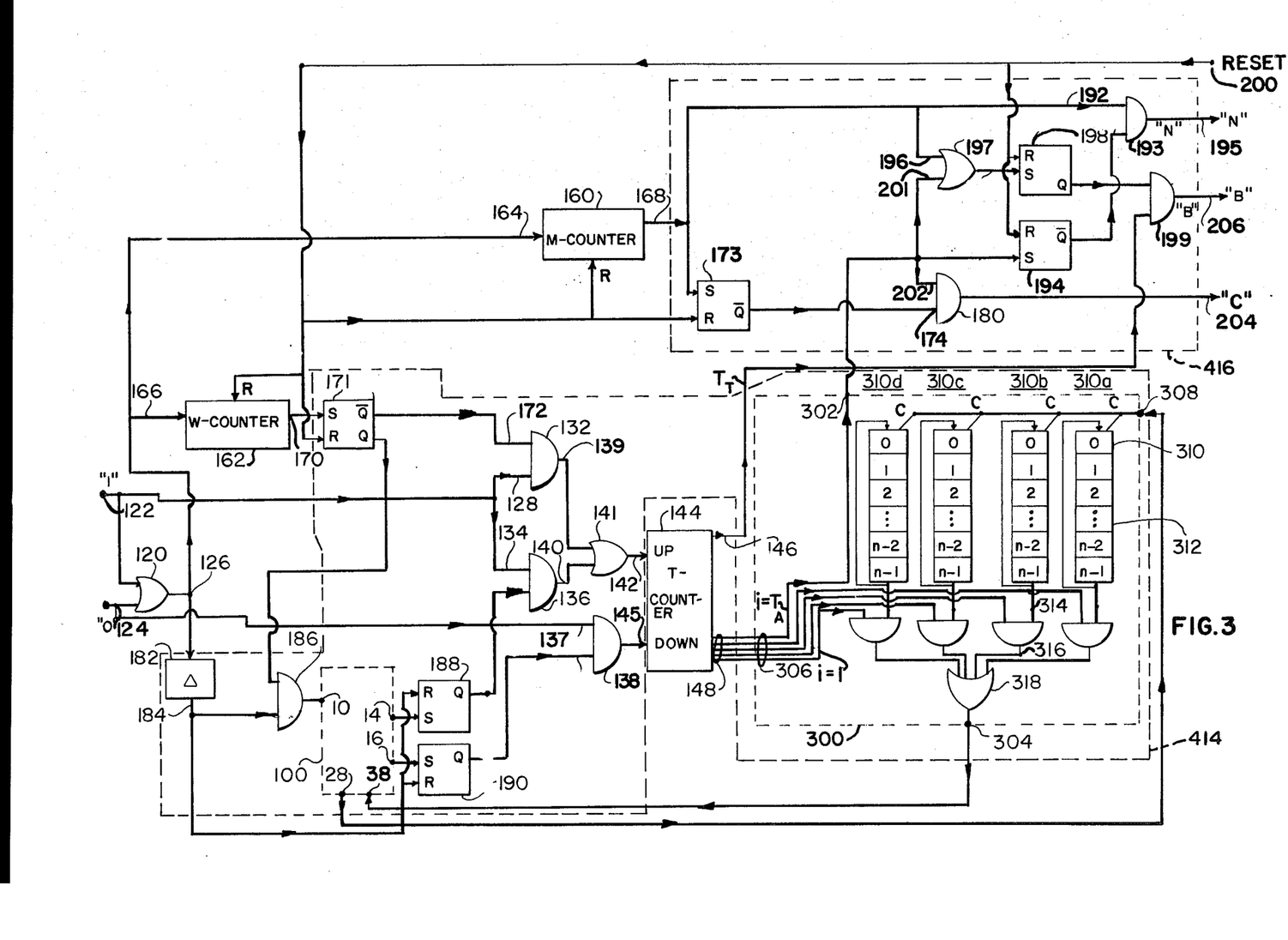
FIG. 3 is a schematic block diagram of the described embodiment of the present invention.

Referring now to FIG. 3, an OR gate 120 has a first input-terminal connected to a 1 device input-terminal 122. A second input-terminal of OR device 120 is connected to a 0 device binary bit input-terminal 124. The OR device 120 has an output-terminal 126.

A first input-terminal 128 of an AND device 132 is connected to device input-terminal 122. Also connected to device input-terminal 122 is a first input-terminal 134 of an AND device 136. A first input-terminal 137 of an AND device 138 is connected to input-terminal 124. The AND devices 132 and 136 have respective output-terminals 139 and 140 connected to input-terminals of an OR device 141. The output-terminal of OR device 141 is connected to an "Up count" input-terminal 142 of a T-counter 144. The output-terminal of AND gate 138 is connected to a "down-count" input-terminal 145 of T-counter 144. T-counter 144 has a first output-terminal 146 for a signal $T_T$, and a set of $T_i$ output-terminals 148.

An M-counter 160 and a W-counter 162 have respective input-terminals 164 and 166 connected to OR device output-terminal 126. M-counter 160 and W-counter 162 have respective output-terminals 168 and 170. W-counter output-terminal 170 is connected to the "set" terminal S of a flip-flop device 171. The complementary output signal Q of flip-flop device 171 is connected to an input-terminal 172 of AND device 132. M-counter output-terminal 168 is connected to the "set" terminal of a flip-flop device 173.

The complementary output-terminal Q of flip-flop device 173 is connected to a first input-terminal 174 of an AND device 180.

The input-terminal of a delay device 182 is connected to OR device output-terminal 126. An output-terminal 184 of delay device 182 is connected to a input-terminal of an AND device 186. The non-complementary output-terminal Q of flip-flop device 171 is connected to the other input-terminal of AND device 186. The output-terminal of AND device 186 is connected to a clock-start input-terminal 10 of a Binary Sequence Generator 100.

The Binary Sequence Generator 100 is fully described in U.S. Pat. No. 3,961,169 of Walton Bishop and John L. Hovey, entitled "Biased Bit Generator," filed on Mar. 25, 1975 reference to which is hereby made will not be discussed in great detail since it is incorporated by reference. Generally, however, the Binary Sequence Generator generates binary 0's and 1's at its output-terminals 14, 16 respectively. The ratio of 1's to 0's generated is established by a serial binary number applied at the probability setting means input-terminal 38. Clock signal pulses are made available at clock output-terminal 28. As not shown in the schematic diagram of FIG. 1 of Bishop et al, but as required in the embodiment of the present invention, clock 26 in sequence generator 100 (of FIG. 1 of Bishop et al) has a "stop terminal" connected to the output-terminal 60 of N-counter 30.

Delay device output-terminal 184 is connected to the reset terminal R of both a flip-flop device 188 and a flip-flop device 190. Flip-flop device 188 has a set terminal S connected to Binary Sequence Generator 0 output-terminal 14, while flip-flop 190 has a set terminal $s$ connected to Binary Sequence Generator "1" output terminal 16. The non-complementary output Q terminal of flip-flop 188 is connected to the other input-terminal of AND gate 136, while the non-complementary output Q of flip-flop 190 is connected to the other input-terminal of AND gate 138.

M-counter output-terminal 168 is also connected to an input-terminal 192 of an AND gate 193. A flip-flop device 194 has a set terminal $s$ connected to the $T_A$'th output-terminal of the group of $T_i$ terminals 148. The complementary output-terminal $\overline{Q}$ from the flip-flop 194 is connected to the other input-terminal of AND device 193. The output-terminal of AND device 193 forms a device output-terminal 195 labeled N (termed a "NON-ACCEPT" decision signal terminal).

Also connected to M-counter output-terminal 168 is a first input-terminal 196 of an OR device 197. The output-terminal of OR device 197 is connected to the "set" input-terminal $s$ of a flip-flop device 198. A non-complementary output terminal Q of flip-flop 198 is connected to an input-terminal of an AND device 199. A second input-terminal of AND device 199 is connected to the $T_T$ output-terminal 146 of T-counter 148.

A device input-terminal 200 labeled RESET serves as a reset-command input-terminal. The reset terminals R of W-counter 162, M-counter 160, and flip-flop devices 171, 173, 194 and 198 are all connected to the device "RESET" terminal 200.

A probability setting means is depicted in phantom block 300 as having a $T_A$ counter output-terminal 302 and a serial binary number signal output-terminal 304. Probability setting means 300 also has a set of $T_i$ count input-terminals 306, and a main clock input-terminal 308.

$T_A$-count output-terminal 302 is connected to a "set" terminal $s$ of flip-flop device 194, as well as to the input-terminals 201 of OR 197, and 202 of AND 180.

Probability setting means 300 is comprised of a set of a number $u$ of shift registers 310. In this described embodiment of the invention, $u$ is chosen equal to 4, and shift registers 310 utilized are labeled 310$a$ through 310$d$. Each shift register 310 is comprised of $n$ shift register stages 312. The most significant stage in each register is denoted as $n$-1 and serves as the register's output stage. Each shift register 310 has a clock input-terminal C connected to main clock input-terminal 308. Main clock terminal 308 is connected to the Binary Sequence Generator clock output-terminal 28. Also, each shift register 310 has its output-terminal stage connected to its input-terminal stage (denoted 0). Each shift-register output-stage is connected to a first input-terminal 314 of a corresponding AND device 316. The second input-terminal of each AND device 316 is connected to a corresponding output-terminal of the group of terminals 148 of T-counter 144. The output-terminal of each AND device 316 is connected to an input-terminal of an OR device 318. The output-terminal of OR device 318 forms probability setting means output-terminal 304 which is connected to Binary Sequence Generator probability setting means input-terminal 38. A device output-terminal 204, denoted as C forms an ACCEPT decision output-terminal, and is connected to the output-terminal of AND gate 180. Another device output-terminal 206, denoted as B forms a "Special information" output-terminal and is connected to the output-terminal of AND device 199.

In operation, the described embodiment of the present invention produces an "Accept" signal at output-terminal 204 in accordance with a decision making procedure relating to the number of input digital 1's of the last W input signals (1's and 0's). The "Accept" decision is made whenever the number of input digital 1's reaches a predetermined threshold $T_A$. A "Non-Accept" decision signal is produced at output-terminal 195 if, in M input signals, the threshold $T_A$ has not been reached.

The decision making process of the present invention implements, in effect, a classical probability Urn problem in which three urns are used. The first of these three urns contains a large number of balls, a fixed percentage of which is black. The second urn is exactly like the first, but contains a smaller percentage of black balls. The third urn is empty.

One of the first two urns is selected at random, then thoroughly shaken, and a ball drawn from it. The color of the ball is noted and then it is returned to its urn. Then a ball of the noted color is placed in the third urn.

The process of shaking, drawing (and replacing) a ball from one of the first two urns, and placing a ball of the same color as the drawn (into the third urn) is repeated until W balls have been collected in the third urn. Thereafter, before another ball is drawn from the selected (first or second) urn, the third urn is thoroughly shaken, and a ball drawn from it. This drawn ball is thrown away.

The process of removing a ball from the third urn and replacing it with another ball of the same color drawn from the selected urn (first or second urn) on a new drawing may be repeated a predetermined number M of times.

As the above described procedure is followed, a count is kept of the number of black balls in the third urn. If the number of black balls in this urn becomes equal to $T_A$ before M drawings from the selected (first or second) urn have been made (and an appropriate ball has been put into the third urn after each drawing), the decision is made that the selected urn was the urn that contained the higher percentage of black balls. If the number of black balls in the third urn does not become equal to $T_A$ by the time M drawings have been made, then the alternate decision (i.e., that the selected urn contained the lower percentage of black balls) is made. The numbers $T_A$ and W are selected so that specified decision criteria will be satisfied.

In the described embodiment of the present invention, the first two urns correspond to "friends" and "enemies" in an IFF system where friends produce a higher percentage of correct replies (i.e., 1's or black balls) to interrogations than enemies produce. The decision making process of the present invention implements this classical problem.

A typical application for the Electronic Urn Decision Technique of the present invention is in deciding when replies to interrogations by a secondary radar system should be accepted as being from friendly aircraft—a decision which in essence depends on the number of correct replies received in the total number of last replies received.

In operation, a correct reply produces (by apparatus not shown) an input binary 1 pulse on input-terminal 122, while other than a correct reply produces a binary "0" or input-terminal 124. The 1's and 0's fed to the electronic urn decider of the described embodiment of the present invention are each counted in the followng manner: W-counter 162 and M-counter 160 count the total number of 1's and 0's, while T-counter 144 counts the number of 1's received until a count of W is reached by W-counter 162.

When a predetermined sample (both 1's and 0's) of size W is achieved, and if T-counter 144 has not reached a count of $T_A$, the heart of the decisional process begins—from T-counter 144 either a 1 is removed with the probability $x/w$ or, in effect, a 0 is removed with a probability $w-x/w$ (where $x$ is the number of 1's is counted by T-counter 144). The removal of this 1 or 0 prepares the urn (T-counter 144) to receive another 1 or 0 from input-terminal 122 or 124 respectively.

Each time a pulse enters on either lead 122 or 124, the pulse passes through OR gate 120, causing M-counter 160 and W-counter 162 to count up one unit. The output pulse from OR gate 120, after a short delay (i.e., on the order of a few microseconds) by delay device 182, is applied to an input-terminal of AND gate 186 (AND gate 186 is inhibited by not receiving a signal from the normally reset flip-flop 171 associated with W-counter 162 until W-input pulses have been counted). The delayed pulse is also applied to the reset terminals R of flip-flops 188, 190, resetting them (if they are not already reset).

Each input pulse on 1 lead 122 will also be applied to an input-terminal 128 of AND gate 132 (the other AND gate input signal at terminal 172 supplied by $\overline{Q}$ output-terminal of flip-flop 171 which is in the reset position until a count of W is reached). The output-signal from AND gate 132 is applied to OR gate 141 whose output is in turn applied to up-counter input-terminal 142 of T-counter 144, causing it to count up one unit. Pulses entering on 0 lead 124 before W-counter 162 has reached a count of W will not be able to pass AND gate 138 (because Q output-terminal of flip-flop 190 will be low (from being initially reset).

When W-counter 162 reaches a count of W, it produces an output pulse that sets flip-flop 171, thus removing the $\overline{Q}$ output voltage that had previously held AND gate 132 open and providing a Q output voltage that now enables AND gate 186 to pass pulses from delay device 182 to binary sequence generator start terminal 10. (Note that the reaching of a count of W corresponds to having W balls in the third urn). The binary sequence generator then generates clock pulses at clock output-terminal 28 at a rate at least $n$ times as rapidly as pulses arrive at start terminal 10. The generator 100 generates binary 1's and 0's on a probabilistic basis (as described in the previously referred to pending Application of Bishop et al).

The effect of various combinations of input pulse and binary number sequence generator output 1's and 0's are summarized in Table I.

If binary sequence generator 100 generates a 1 (a pulse at its output-terminal 16) and the next input pulse received is a 1 (a pulse of input-terminal 122) T-counter 144 remains unchanged, but if the next input pulse received is a 0, T-counter 144 decreases its count by 1, causing the $T_i$ index to decrease by 1 and thereby to connect a shift register 310 corresponding to the new $T_i$ index to probability setting means input terminal 38.

If binary sequence generator 100 generates a 0 (a pulse at its output-terminal 14) and the next input pulse received is a 0, T-counter 144 remains unchanged. However, it the next input pulse is a "1", T-counter 144 counts up one and thereby connects a shift register 310 corresponding to the new $T_i$ index to probability setting means input-terminal 38. Thus it may be seen that the changes in the count of T-counter 144 are approximately equivalent to:

(1) drawing a black ball out of an urn containing W balls, $T_i$ of which are black. (It should be noted that the probability that a ball removed will be black is equal to $$\frac{B_i}{2^n} \approx \frac{T_i}{W}$$

where Bi = the number stored in register 310$i$ ($i=a$ or $b$ or $c$ or . . . ) and $n$ = the number of stages in each of the registers 310 $a$, $b$ . . . )

| Input pulse | Binary Number Sequence Generator Output | T-counter Counts | Change in Selection Shift Registers 310 |
|---|---|---|---|
| Counts < W | 1 | Up one | No Change (none selected until count of W is reached) |
| | 0 | No Change | No Change (none selected until count of W is reached) |
| Counts < W | 1    1 | No Change | No Change |
| | 0 | Up one | Shifts to next "higher" index shift register |
| | 0    1 | Down one | Shifts to next "lower" index shift register |
| | 0 | No change | No change | and then (2) adding a ball drawn from another urn (i.e., the first or second urn) where the probability that it will be black is $p$. Whether the T-counter 144 counts up, or down, or remains unchanged depends upon the product of two factors:

The first, whether a 1 or a 0 was just previously removed; and second, whether the next input pulse received is a 1 or a 0. As previously stated, removing a 1 is done with the probability of $$\frac{B_i}{2^n} \approx \frac{T_i}{W}$$

and the equivalent of removing a 0 is done with the probability W-Ti/W. The removal of a 0 with this probability is critical to implementation of the decision technique of the present invention. The electronic analog of "drawing a ball" from an urn that contains X (or Ti) black balls and W–X white ones is the very heart of this invention.

When T-counter 144 reaches a predetermined counter of $T_A$, an accept decision will be made as long as M-counter has not reached of count of M. Thus an ACCEPT decision signal will be produced at C terminal 204.

If on the other hand a count of M has been reached but no ACCEPT decision has been made (because T-counter 144 has not reached a count of $T_A$, thus allowing flip-flop 194 $\overline{Q}$ voltage to keep AND gate 193 energized), then the M-counter output voltage produces a NON-ACCEPT signal on N terminal 195.

Threshold $T_T$ is generally chosen to be a very low number such that in normal operation, T-counter 144 will reach a count higher than $T_T$. Flip-flop 198 will thus be reset by either M-counter 160 reaching a count of M or T-counter 144 reaching a count of $T_A$, which ever occurs first. The setting of flip-flop 198 will energize the first input to AND gate 199. Thereafter, as input signals 0 come into the device at input terminal 124 the T-counter 144 will continue decreasing toward 0. As threshold $T_T$ is crossed T-counter produces again a $T_T$ signal energizing the other input of AND gate 199 and therefore producing a signal at output terminal B. This signal is useful in an IFF system as a "Trailing Edge Detector". An output pulse is provided at the $T_A$ output line of terminals 148 when a count of $T_A$ is reached, but on the output leads 1 to $T_A$–1, it provides an output voltage (constant) only on the lead corresponding to the number equal to the number counted (i.e., between W and $T_A$–1) at any given time. Thus, after a count of W has been reached, one and only one of AND gates 316 will be made operative at any given time. The concept of a radar-search-beam trailing edge in terms of IFF is explained in U.S. Patent application Ser. No. 617,228 which is incorporated herein by reference.

Clock pulses applied at clock terminal 308 cause all of the shift registers 310 to shift through one complete cycle (since each register has $n$ stages and each is provided with a feedback loop). A register 310 connected to its corresponding AND gate 316 which is enabled will have its contents shifted through this AND gate and then through OR gate 318 to number sequence input-terminal 38.

The process described thus far continues until either T-counter 144 reaches a count of $T_A$, or M-counter 160 reaches a count of M. If T-counter 144 reaches its count of $T_A$ first, it produces an output pulse on output-terminal $T_A$, which is then applied to input-terminal 202 of AND gate 180, thus generating an ACCEPT output signal at C terminal 204. This C terminal signal may act as a Friend-Accept decision signal.

The output signal on the $T_A$'th terminal of the group of T output terminals 148 also sets flip-flop 194, and goes through OR gate 197 to set flip-flop 198. Setting of flip-flop 194 removes the voltage from one input to AND gate 193 so that a pulse from M-counter 160 that may occur later cannot pass. Setting flip-flop 198 enables AND gate 199 so that when T-counter 144 counts back down to a count of $T_T$, a pulse on line $T_T$ (at output-terminal 146) will be able to pass AND gate 199 and go to B output-terminal 206. This output may, for example, provide a useful signal to a Trailing Edge Detector in a secondary radar system.

When M-counter 160 reaches a count of M, it produces an output pulse which stops clock 26 (c.f. FIG. 1 of Bishop et. al. supra), sets flip-flop 173, and is applied to a terminal 196 of OR gate 197, and to terminal 192 of AND gate 193. Setting of flip-flop 173 removes the voltage on one input to AND gate 180, thus preventing any later output on lead $T_A$ from the group of $T_i$ output-terminals 146 to pass. Setting flip-flop 198 permits a signal (useable as a trailing edge indicating pulse) on lead $T_T$ from counter 144 to pass (as previously described).

Finally, an input pulse on R lead terminal 200 resets counters and switches that are not already reset so that the circuit is ready to perform another evaluation.

Thus it is seen from the above discussion that the decision making technique of the present invention is clearly related to and utilizes well-known probability principles, thus providing a decision making technique which is not only very useful and highly predictable (in a statistical sense) but whose decision making process may be described in meaningful and useful analytical terms.

Figure 4:
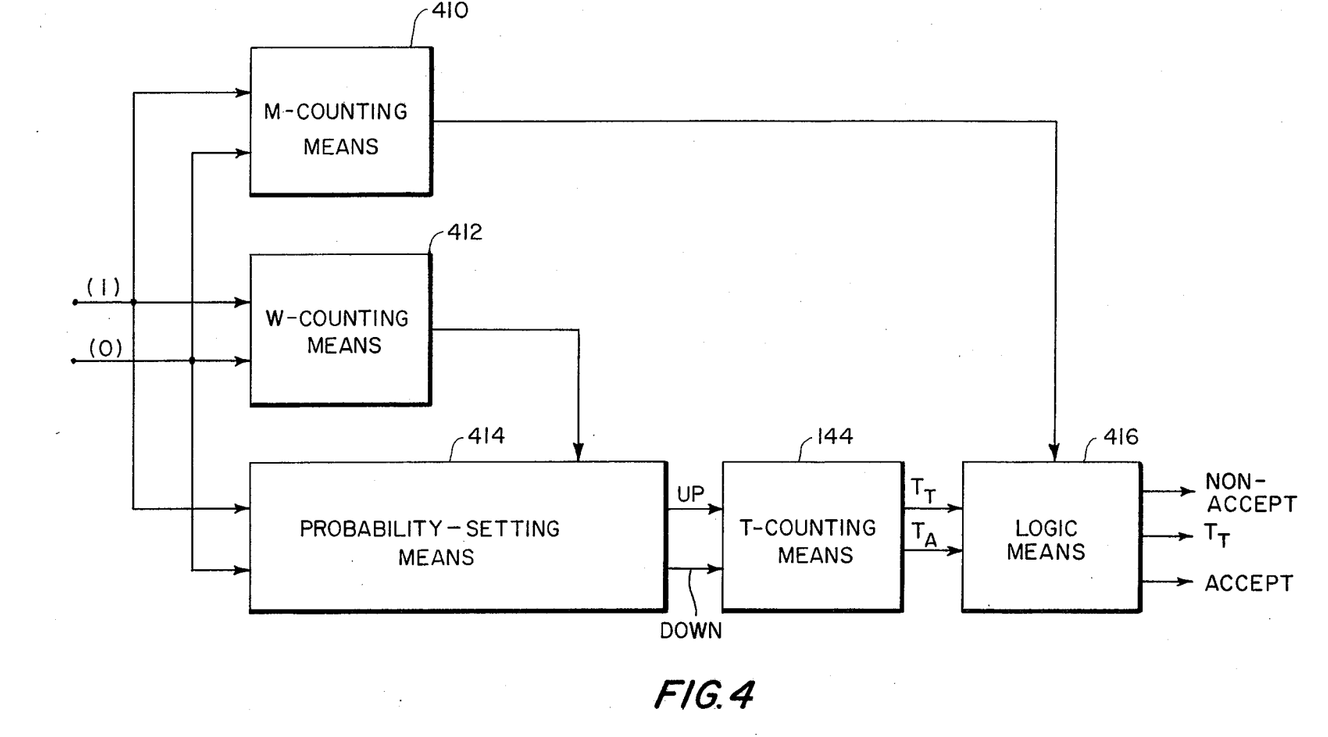
FIG. 4 is a functional block diagram of the embodiment of the invention shown in FIG. 3.

FIG. 4 shows the circuit of FIG. 3 consolidated into functional blocks. Block 416, the logic means, and block 414, the probability setting means, are outlined in dashed lines on FIG. 3. The threshold counting means is the same as T-counter 144. M-Counting Means 410 includes M-Counter 160 and OR gate 120; W-Counting means includes W-Counter 162 and OR gate 120.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. A decision device for making probabilistic decisions regarding the most recent set, W, of a series of binary 1 and 0 sample signals comprising, in combination:
   terminal means for connection to separate sources of binary 1 and 0 sample signals;
   W-counting means for counting the total number of 1 and 0 sample signals received and providing an output signal when the total exceeds a preselected number, W;
   T-counting means for receiving a continuing series of binary 1 and 0 signals and converting them to a number of output signals, $T_i$, where $i$ is a number from 1 to a preselected value A, $T_A$ corresponding to a probability value of 1's relative to the number of 1's and 0's in said T-counting means which has been selected as the probability level at which an Accept decision will be made;

probability-setting means, connected to said terminal means, said W-counting means and said T-counting means, said probability-setting means including special-purpose, pseudorandom, binary-sequence-generator means, for causing the count of said T-counting means, after the W-counting means has reached a count of W, to be reduced by one unit with a probability of $T_i/W$ if the received input binary sample is a 0, and to be increased by one unit with a probability of $W-T_i/W$ if the received input binary sample is a 1;

M-counting means, connected to said terminal means, for counting said 1 and 0 samples and producing an output signal when the total number of 1's and 0's becomes equal to M, a preselected binary number related to the maximum number of samples to be considered before a NON-Accept decision is made, M being a number greater than the number W;

logic means, connected to receive the output signal of said M-counting means and the $T_A$ output signal of said T-counting means, for generating a Non-Accept output signal whenever said M-counting means reaches a count of M before said T-counting means reaches a count of $T_A$ and for generating an Accept signal whenever said T-counting means reaches a count of $T_A$ before said M-counting means reaches a count of M.

2. A decision device as in claim 1, further including: second terminal means for connection to a reset-signal source for resetting the decision device to an initial starting condition, said second terminal means being connected to said M-counting means, said T-counting means, and said logic means.

3. A decision device as in claim 1, wherein said T-counting means produces a further output signal, $T_T$, which is fed to said logic means, $T_T$ being a number which is smaller than $T_A$ and being produced whenever the count of said T-counting means decreases from a count greater than $T_T$ to $T_T$.

4. A decision device as in claim 1, wherein said probability-setting means includes means for storing different binary numbers, $B_i$, corresponding to different preselected probability values, each said $T_i$ output signal from said T-counting means being connected to permit a different one of said $B_i$ numbers to be fed to said binary-sequence-generator means for comparison with a binary number, Y, generated thereby, said binary-sequence-generator means generating a signal for decreasing by one unit the count of said T-counting means when $B_i$ is less than Y and a binary 0 sample signal is received by the decision device and generating a signal for increasing by one unit the count of said T-counting means when $B_i$ is equal to or greater than Y and a binary 1 sample signal is received by the decision device.

5. A decision device as in claim 4, wherein said probability-setting means includes means for permitting said increasing and decreasing signals to pass to said T-counting means only after the W-counting means has reached a count of W.

* * * * *